(12) United States Patent
Kikawada et al.

(10) Patent No.: US 12,348,096 B2
(45) Date of Patent: Jul. 1, 2025

(54) COIL HAVING SEGMENT CONDUCTORS WELDED WITH A WELDED METAL PORTION

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Masakazu Kikawada, Yokohama (JP); Tetsuo Sakai, Taito (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 592 days.

(21) Appl. No.: 17/651,449

(22) Filed: Feb. 17, 2022

(65) Prior Publication Data

US 2022/0173629 A1 Jun. 2, 2022

Related U.S. Application Data

(63) Continuation of application No. PCT/JP2019/037791, filed on Sep. 26, 2019.

(51) Int. Cl.
*H02K 3/12* (2006.01)
*H02K 1/16* (2006.01)
*H02K 3/32* (2006.01)

(52) U.S. Cl.
CPC ............... *H02K 3/12* (2013.01); *H02K 1/16* (2013.01); *H02K 3/32* (2013.01)

(58) Field of Classification Search
CPC .. H02K 3/32; H02K 3/42; H02K 3/04; H02K 3/03; H02K 3/38; H02K 3/12; H02K 3/14;

(Continued)

(56) References Cited

U.S. PATENT DOCUMENTS 3,710,437 A * 1/1973 Kipple ............... H02K 15/12
29/598
4,616,407 A * 10/1986 Tamaki ............... H02K 15/12
29/598

(Continued)

FOREIGN PATENT DOCUMENTS

JP 3303854 B2 7/2002
JP 3964116 B2 8/2007

(Continued)

OTHER PUBLICATIONS

International Search Report issued Dec. 3, 2019 in PCT/JP2019/037791 filed on Sep. 26, 2019, 2 pages.

*Primary Examiner* — Maged M Almawri
(74) *Attorney, Agent, or Firm* — Oblon, McClelland, Maier & Neustadt, L.L.P.

(57) ABSTRACT

A coil includes first and second segment conductors, and a welded metal portion where the first and second segment conductors are welded. The first and second segment conductors each include: a fixed portion held in a stator core to extend in a first direction; an inclined portion protruding from the stator core, extending in a second direction inclined with respect to the first direction, and including side surfaces covered with an insulative coating film; and a weld portion that is at a tip of the inclined portion and includes a first surface located within an extension plane in the second direction of one surface of the side surfaces, a second surface contacting the first surface, and a third surface contacting the second surface. The welded metal portion contacts the first, second, and third surfaces of the first segment conductor, and the first and second surfaces of the second segment conductor.

10 Claims, 17 Drawing Sheets

(58) Field of Classification Search
CPC .. H02K 3/52; H02K 3/28; H02K 3/00; H02K 3/46; H02K 3/50; H02K 3/522; H02K 1/16; H02K 15/12; H02K 15/0442; H02K 15/095; H02K 15/105; H02K 2203/09; H02K 2203/12; H01F 5/06
USPC ....... 310/179–208; 29/603.23, 605, 606, 596
See application file for complete search history.

(56) References Cited

U.S. PATENT DOCUMENTS

| | | | | |
|---|---|---|---|---|
| 6,181,043 B1* | 1/2001 | Kusase | .................... | H02K 3/50 310/201 |
| 6,459,177 B1* | 10/2002 | Nakamura | ............... | H02K 3/12 310/201 |
| 7,847,465 B2* | 12/2010 | Tokizawa | ................ | H02K 3/12 310/201 |
| 8,604,655 B1* | 12/2013 | Ferran | ...................... | H02K 3/28 310/179 |
| 8,659,202 B2* | 2/2014 | Ikeda | ...................... | H02K 3/12 310/179 |
| 8,772,995 B2* | 7/2014 | Ogihara | ................. | H02K 15/35 310/201 |
| 8,878,413 B2* | 11/2014 | Wolf | .................. | H02K 15/0431 310/58 |
| 8,987,969 B2* | 3/2015 | Kamatani | .......... | H02K 15/0433 310/201 |
| 9,419,484 B2* | 8/2016 | Tokizawa | ............... | H02K 15/04 |
| 9,496,773 B2* | 11/2016 | Ishigami | ............... | B60L 50/40 |
| 9,559,573 B2* | 1/2017 | Baba | .................... | H02K 15/105 |
| 9,647,502 B2* | 5/2017 | Takahashi | ................ | H02K 9/19 |
| 10,063,117 B2* | 8/2018 | Nakayama | ............... | H02K 3/28 |
| 10,128,728 B2* | 11/2018 | Hirao | ...................... | H02K 3/14 |
| 10,389,199 B2* | 8/2019 | Langlard | ................ | H02K 15/33 |
| 11,349,378 B2* | 5/2022 | Miyazaki | ........... | H02K 15/0421 |
| 11,557,931 B2* | 1/2023 | Nishikuma | ............ | B21D 11/20 |
| 2001/0011852 A1* | 8/2001 | Nakamura | ............... | H02K 3/34 310/201 |
| 2002/0033649 A1* | 3/2002 | Oohashi | ................... | H02K 3/28 310/201 |
| 2003/0127934 A1* | 7/2003 | Koike | .................... | H02K 15/35 310/201 |
| 2003/0135980 A1* | 7/2003 | Ichikawa | ............... | H02K 15/35 29/598 |
| 2006/0267440 A1* | 11/2006 | Sakai | .................... | H02K 15/064 310/184 |
| 2008/0246354 A1* | 10/2008 | Asao | ...................... | H02K 15/12 310/45 |
| 2010/0001609 A1* | 1/2010 | Ishigami | .................. | H02K 3/12 310/202 |
| 2010/0270094 A1* | 10/2010 | Nakayama | ......... | H02K 15/0421 180/65.21 |
| 2011/0036614 A1* | 2/2011 | Otsuka | .................... | C22C 21/00 156/50 |
| 2011/0181143 A1* | 7/2011 | Hasegawa | ................ | H02K 3/38 310/180 |
| 2011/0210558 A1* | 9/2011 | Stiesdal | .................... | H02K 3/18 290/55 |
| 2012/0133235 A1 | 5/2012 | Ogihara | | |
| 2013/0200743 A1* | 8/2013 | Okimitsu | ................. | H02K 3/12 310/201 |
| 2013/0300246 A1* | 11/2013 | Kaimori | ................ | B60L 3/0061 310/201 |
| 2014/0069686 A1* | 3/2014 | Abe | ...................... | H01B 7/0275 521/88 |
| 2014/0225465 A1* | 8/2014 | Goto | ........................ | H02K 3/12 310/71 |
| 2017/0117782 A1 | 4/2017 | Hirao | | |
| 2017/0126106 A1 | 5/2017 | Mizushima et al. | | |
| 2017/0264155 A1* | 9/2017 | Nakayama | ............... | H02K 1/16 |
| 2018/0262071 A1 | 9/2018 | Nishikuma | | |
| 2018/0323672 A1* | 11/2018 | Juris | ........................ | H02K 3/18 |
| 2019/0207439 A1* | 7/2019 | Marino | .................... | H02K 1/20 |
| 2019/0252957 A1 | 8/2019 | Onda et al. | | |
| 2019/0267879 A1 | 8/2019 | Mizushima et al. | | |
| 2020/0235647 A1 | 7/2020 | Koga et al. | | |
| 2022/0271596 A1* | 8/2022 | Takahashi | .......... | H02K 15/0431 |
| 2022/0399786 A1* | 12/2022 | Graef | ...................... | H02K 9/197 |
| 2023/0008528 A1* | 1/2023 | Tonino | .................... | H02K 15/12 |
| 2023/0112188 A1* | 4/2023 | Sawata | .................. | B64D 27/10 310/65 |

FOREIGN PATENT DOCUMENTS

| | | |
|---|---|---|
| JP | 5136920 B2 | 2/2013 |
| JP | 2017-085701 A | 5/2017 |
| JP | 2017-085806 A | 5/2017 |
| JP | 2018-152958 A | 9/2018 |
| JP | 2019-140821 A | 8/2019 |
| WO | WO 2019/059294 A1 | 3/2019 |

* cited by examiner

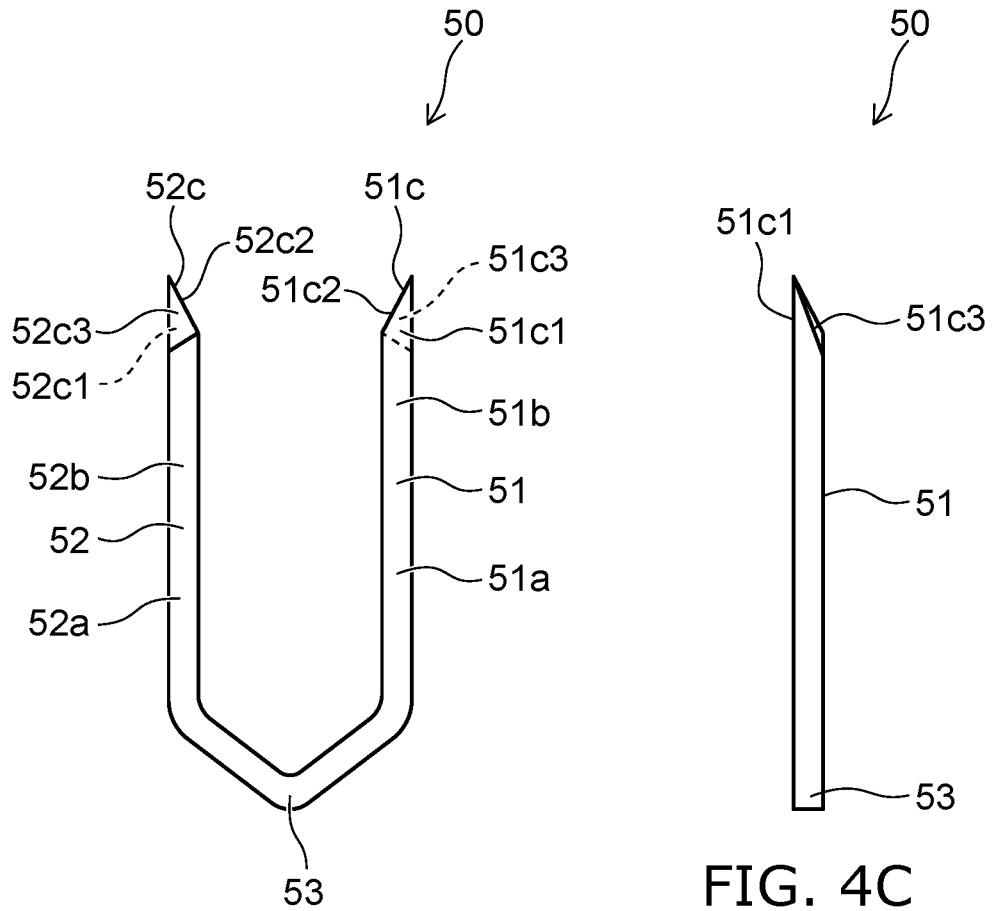
FIG. 4A
FIG. 4C
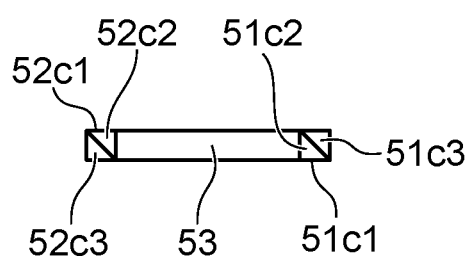
FIG. 4B

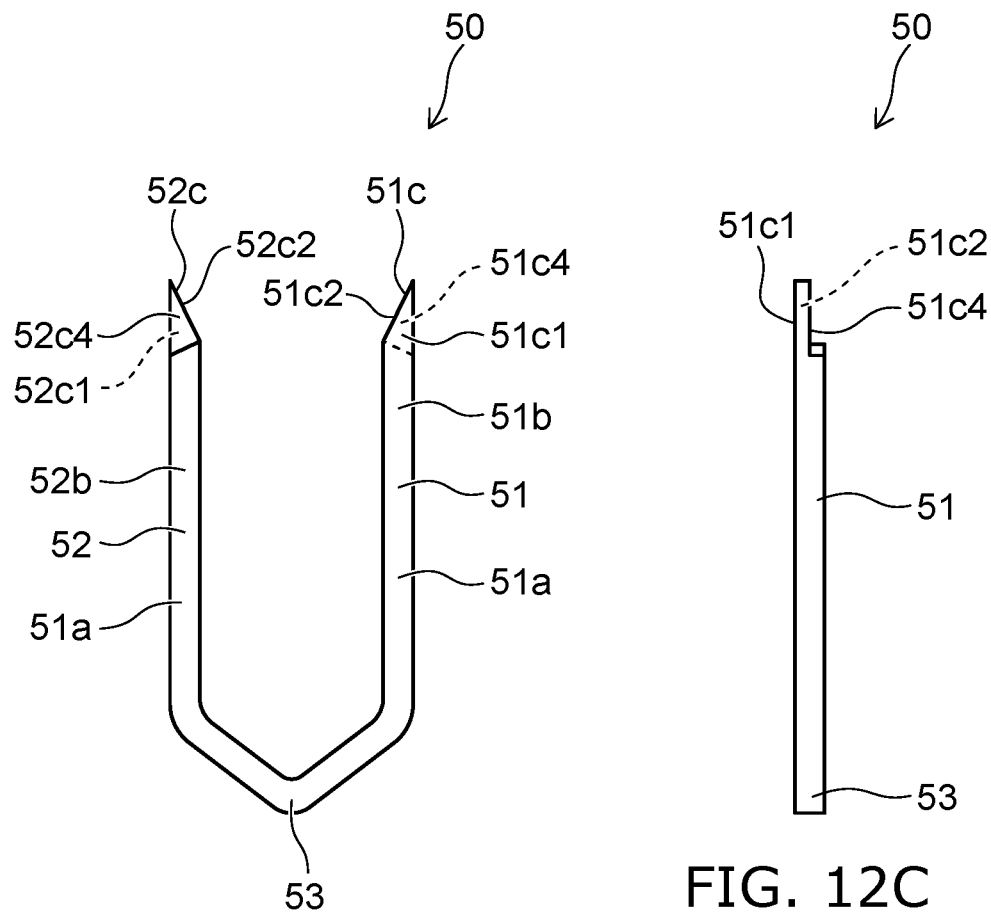
FIG. 12A
FIG. 12C
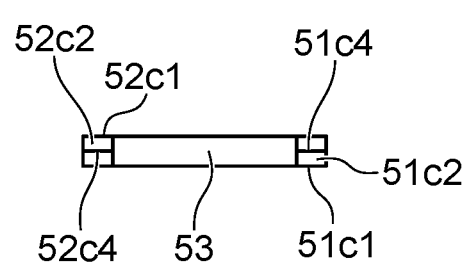
FIG. 12B

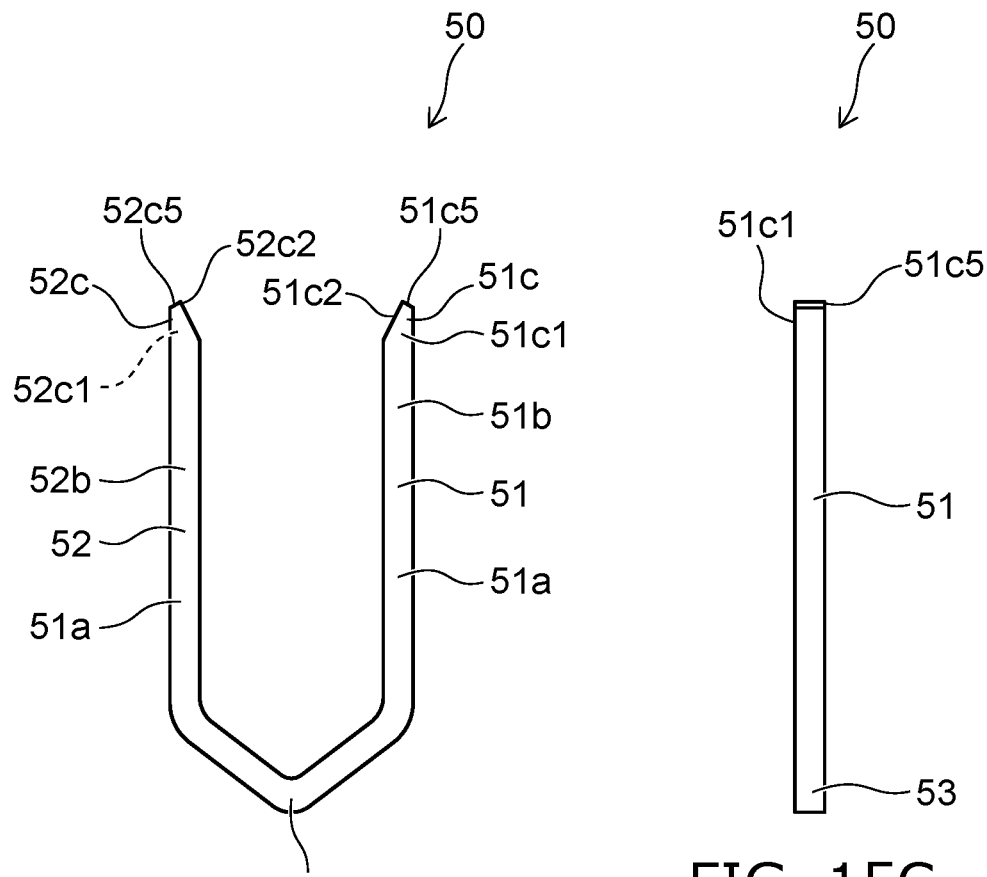
FIG. 15A
FIG. 15C
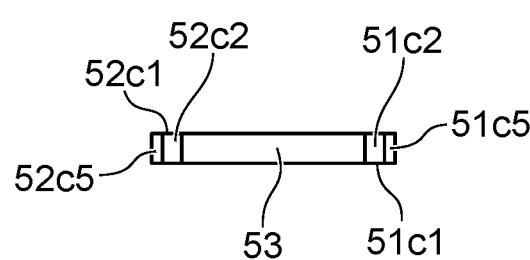
FIG. 15B

COIL HAVING SEGMENT CONDUCTORS WELDED WITH A WELDED METAL PORTION

CROSS-REFERENCE TO RELATED APPLICATION

This is a continuation application of International Application PCT/JP2019/037791, filed on Sep. 26, 2019; the entire contents of which are incorporated herein by reference.

FIELD

Embodiments of the invention relate to a coil and a dynamo-electric machine.

BACKGROUND

A dynamo-electric machine such as a motor, a generator, etc., includes a stator on which a coil is wound. The coil is formed by inserting multiple segment conductors into slots formed in a stator core included in the stator, and by subsequently laser-welding the end portions of the segment conductors to each other. Improvements of the end portion structures of the segment conductors to guarantee the reliability of the weld portions are being investigated due to demands of recent years to reduce the height of the coil.

BRIEF DESCRIPTION OF THE DRAWINGS

FIG. 4A is a front view showing a segment conductor before mounting in a stator core according to the first embodiment; FIG. 4B is a plan view of the segment conductor; and FIG. 4C is a right side view of the segment conductor.

FIG. 12A is a front view showing a segment conductor before being mounted in a stator core according to the second embodiment; FIG. 12B is a plan view of the segment conductor; and FIG. 12C is a right side view of the segment conductor.

FIG. 15A is a front view showing a segment conductor before being mounted in a stator core according to the third embodiment; FIG. 15B is a plan view of the segment conductor; and FIG. 15C is a right side view of the segment conductor.

DETAILED DESCRIPTION

Figure 1:
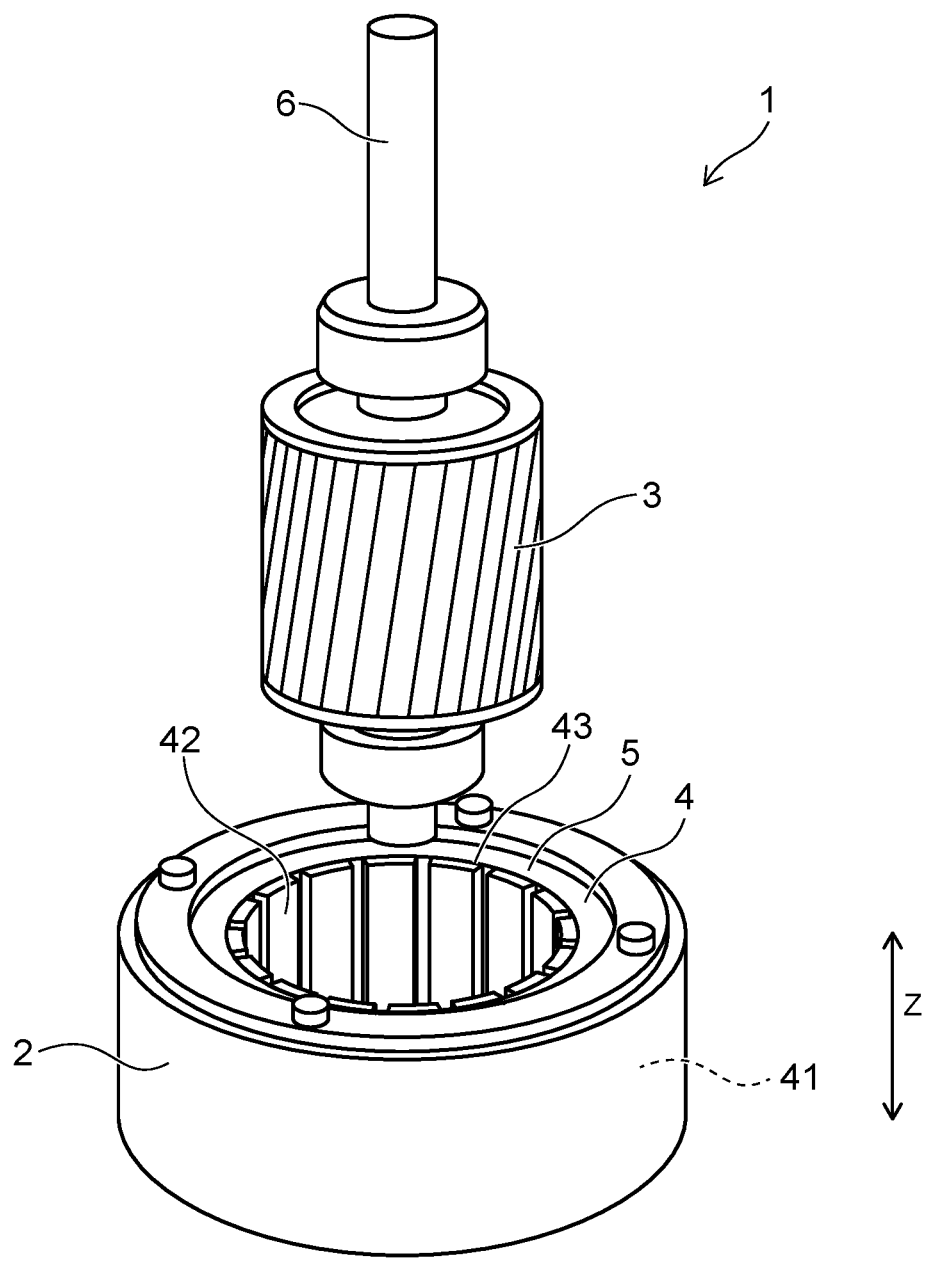
FIG. 1 is a perspective view showing a dynamo-electric machine according to a first embodiment.

The coil according to the embodiment includes first and second segment conductors, and a welded metal portion at which the first and second segment conductors are welded. The first and second segment conductors each include: a fixed portion that is held in a stator core and extends in a first direction; an inclined portion that protrudes from the stator core, extends in a second direction inclined with respect to the first direction, and includes side surfaces covered with an insulative coating film; and a weld portion that is located at a tip of the inclined portion and includes a first surface located within an extension plane in the second direction of one surface of the side surfaces, a second surface contacting the first surface, and a third surface contacting the second surface. The first surfaces of the first and second segment conductors contact each other; the second surfaces of the first and second segment conductors form a continuous surface; and the third surfaces of the first and second segment conductors are separated from each other. The welded metal portion contacts the first, second, and third surfaces of a first segment conductor, and contacts the first and second surfaces of a second segment conductor.

Embodiments of the invention will now be illustrated with reference to the drawings. Similar components in the drawings are marked with the same reference numerals; and a detailed description is omitted as appropriate.

First Embodiment

FIG. 1 is a perspective view showing a dynamo-electric machine 1 according to the embodiment.

As shown in FIG. 1, the dynamo-electric machine 1 includes a stator 2, and a rotor 3 that is rotatably disposed in a cavity formed in the center of the stator 2. The stator 2 includes a stator core 4, a coil 5, and a shaft 6. The dynamo-electric machine 1 can output the rotational force of the rotor 3 from the shaft 6.

The stator core 4 can be multiple ring-shaped magnetic members stacked in the axial direction of the stator 2 (a Z-direction in FIG. 1). For example, the magnetic member can be formed from an electrical steel sheet (a silicon steel sheet). The stator core 4 includes a yoke 41 and multiple teeth 42. The shape of the yoke 41 is tubular; and the yoke 41 is positioned at the outer circumference side of the stator core 4. The multiple teeth 42 are arranged at uniform spacing at the inner circumferential surface of the yoke 41. Each of the multiple teeth 42 protrudes from the inner circumferential surface of the yoke 41 toward the center of the stator core 4 and extends in the axial direction of the stator 2. Also, a groove that is located between the tooth 42 and the tooth 42 is used as a slot 43. The shape, number, and size of the teeth 42 are not limited to those illustrated and can be modified as appropriate according to the application, size, specifications, etc., of the dynamo-electric machine 1 that includes the stator 2.

Figure 2A:
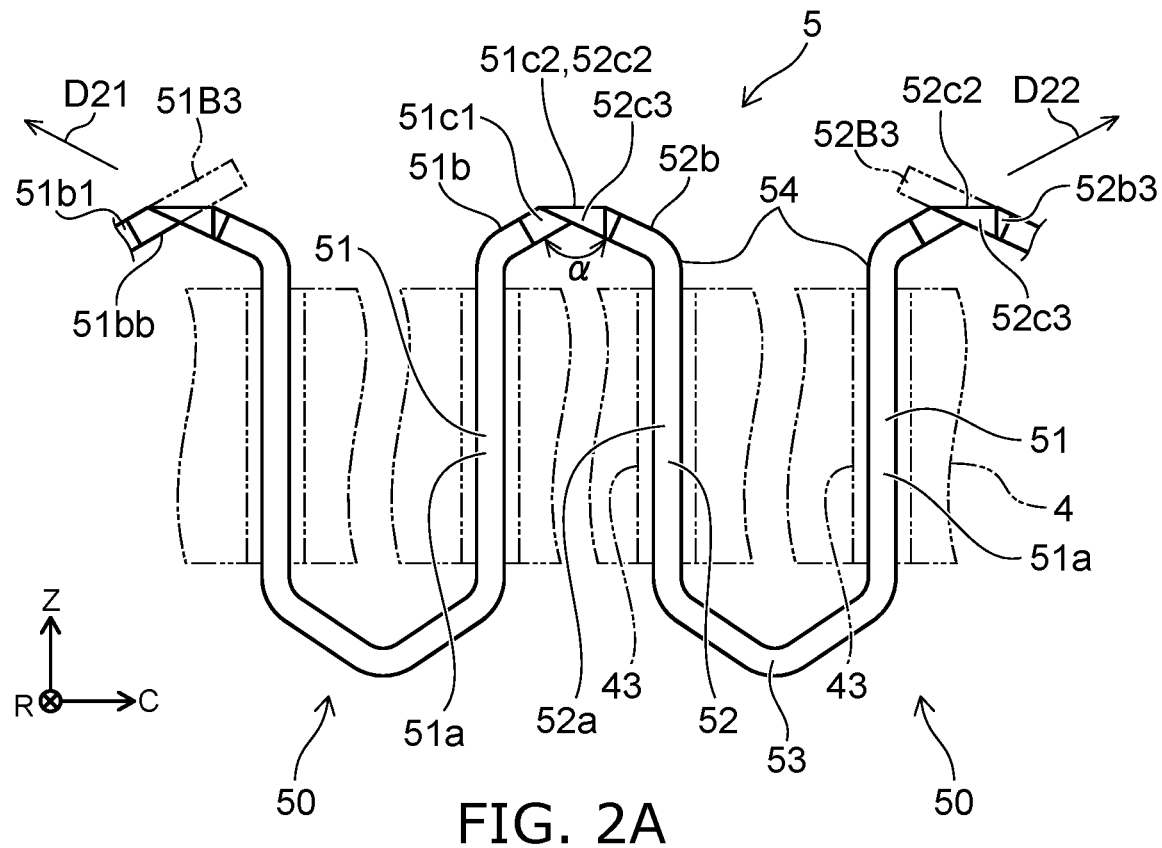
FIG. 2A is a partial front view showing a coil according to the first embodiment.
Figure 2B:
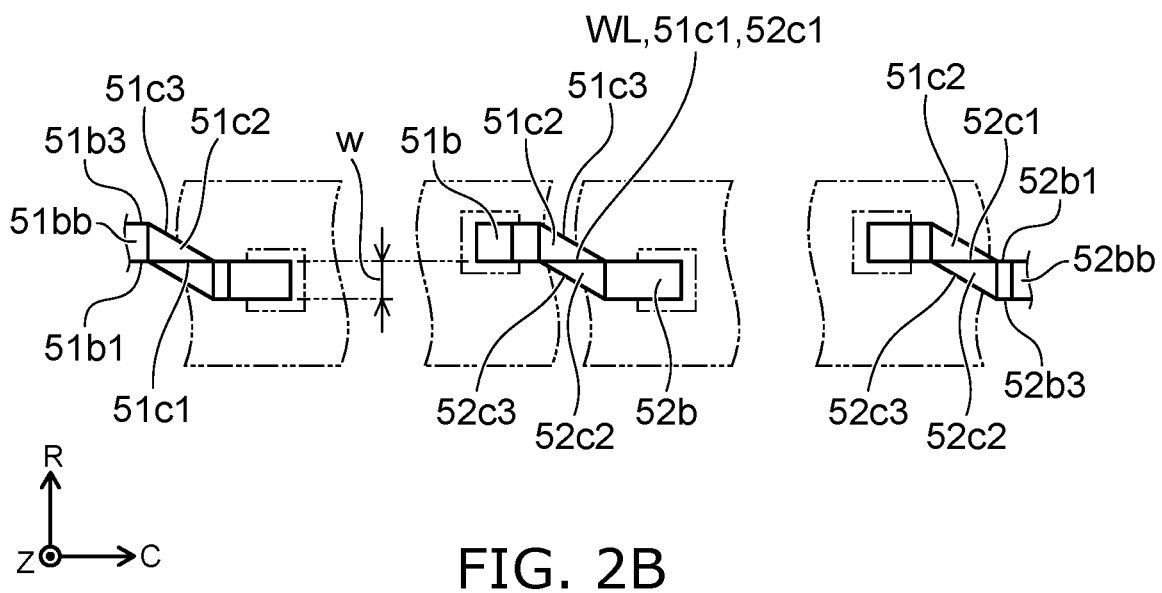
FIG. 2B is a partial plan view of the coil.

FIG. 2A is a partial front view showing the coil 5 according to the embodiment. FIG. 2B is a partial plan view showing the coil 5. FIGS. 2A and 2B each illustrate the state before welding. Here, the thickness direction, i.e., the central-axis direction of the stator 2 and the stator core 4, is taken as a "Z-direction"; the circumferential direction of the stator 2 and the stator core 4 is taken as a "C-direction"; and the diametrical direction of the stator 2 and the stator core 4 is taken as an "R-direction".

As shown in FIGS. 2A and 2B, the coil 5 includes multiple segment conductors 50. The segment conductors 50 are disposed to be arranged in multiple ring shapes when viewed along the Z-direction at the end portion of the stator core 4 at the inner circumference side. The multiple coils 5 are formed by connecting the end portions of the segment conductors 50 to each other by welding.

The exterior shape of each segment conductor 50 is, for example, substantially U-shaped. The segment conductor 50 includes a first branch portion 51 and a second branch portion 52 extending upward respectively from the two sides having a link portion 53 at the center. For convenience herein, a direction among the Z-directions from the link portion 53 toward the first branch portion 51 or the second branch portion 52 of the segment conductor 50 is called "up", and the opposite is called "down". The vertical direction is independent of the direction of action of gravity.

The link portion 53 of the segment conductor 50 protrudes downward from the lower portion of the stator core 4. The portions of the first and second branch portions 51 and 52 at the link portion 53 side are disposed inside the slots 43 located at the inner circumference portion of the stator core 4. The portions of the first and second branch portions 51 and 52 that are separated from the link portion 53 protrude upward from the upper portion of the stator core 4. The segment conductor 50 is formed from a rectangular wire having a quadrilateral cross section.

The first branch portion 51 and the second branch portion 52 respectively include fixed portions 51a and 52a that extend in a first direction D1 and are held in the stator core 4 by being disposed inside the slots 43, inclined portions 51b and 52b that protrude from the stator core 4 and extend respectively in second directions D21 and D22, and weld portions 51c and 52c located at the tips of the inclined portions 51b and 52b. The first direction D1 is, for example, the direction Z. The second directions D21 and D22 are inclined toward mutually-opposite sides at, for example, 45 degrees with respect to the first direction D1. The inclined portions 51b and 52b are formed by bending one end of each of the fixed portions 51a and 52a extending in the first direction D1, for example, 45 degrees toward directions along the circumferential direction (the C-direction) of the stator core 4 away from the link portion 53.

The side surfaces of the fixed portions 51a and 52a, the inclined portions 51b and 52b, and the link portion 53 are covered with an insulative coating film 54 to guarantee insulation from the periphery. On the other hand, the weld portions 51c and 52c are not covered with the coating film 54. The first branch portion 51 and the second branch portion 52 have a substantially symmetric shape with respect to the link portion 53; and the segment conductor 50 has an exterior shape in which the tips of a U-shape open outward.

The second branch portion 52 is shifted in the diametrical direction (the R-direction) of the stator core 4 with respect to the first branch portion 51 by the amount of a thickness w of the segment conductor. Thereby, the weld portion 51c of the first branch portion 51 of the segment conductor 50 (corresponding to an example of a first segment conductor) and the weld portion 52c of the second branch portion 52 of the segment conductor 50 that is adjacent in the C-direction (e.g., corresponding to an example of a second segment conductor) are welded by being arranged in a state in which the weld portions 51c and 52c contact. Similarly, one coil 5 that extends around along the C-direction is formed by welding to connect each of the weld portions 51c and 52c of the multiple segment conductors 50 provided to be arranged in the C-direction.

The weld portions 51c and 52c include first surfaces 51c1 and 52c1, second surfaces 51c2 and 52c2 that contact the first surfaces 51c1 and 52c1, and third surfaces 51c3 and 52c3 that contact the second surfaces 51c2 and 52c2; and continuous surfaces are formed of the first surfaces 51c1 and 52c1, the second surfaces 51c2 and 51c2, and the third surfaces 51c3 and 52c3. The weld portions 51c and 52c are formed into substantially quadrilateral pyramid shapes by cutting away the end portions of the rectangular wires that have quadrilateral cross sections at the second surfaces 51c2 and 52c2 and the third surfaces 51c3 and 512c3. For example, the second surfaces 51c2 and 52c2 are formed by cutting away in a plane perpendicular to the first direction D1; and the third surfaces 51c3 and 52c3 are formed by cutting away diametrical direction R side portions from side surfaces 51bb of the inclined portions 51b to contact the first surfaces 51c1 and 52c1.

The first surfaces 51c1 and 52c1 are surfaces that are continuous with the side surfaces 51bb and 52bb of the inclined portions 51b and 52b, and specifically, are surfaces in which the side surfaces 51bb and 52bb extend in the second directions D21 and D22. The first surface 51c1 of the first branch portion 51 is a surface that is parallel to the circumferential direction (the C-direction) of the stator core 4 and is, for example, a surface that is parallel to the CZ plane. The first surface 52c1 of the second branch portion 52 is a surface that is parallel to the circumferential direction (the C-direction) of the stator core 4 and is, for example, a surface that is parallel to the CZ plane. The first surface 51c1 and the first surface 52c1 face each other. For example, the first surface 51c1 faces the outer side of the stator core 4; and the first surface 52c1 faces the inner side of the stator core 4.

Thereby, the first surface 51c1 of the first branch portion 51 of the segment conductor 50 (corresponding to an example of the first segment conductor) contacts the first surface 52c1 of the second branch portion 52 of another segment conductor 50 that is adjacent in the positive C-direction (corresponding to an example of the second segment conductor). The first surface 52c1 of the second branch portion 52 of the segment conductor 50 (corresponding to an example of the first segment conductor) contacts the first surface 51c1 of the first branch portion 51 of another segment conductor 50 that is adjacent in the negative C-direction (corresponding to an example of the second segment conductor).

The second surface 51c2 of the first branch portion 51 and the second surface 52c2 of the second branch portion 52 of the segment conductor 50 that is adjacent in the positive C-direction are, for example, surfaces that are perpendicular to the first direction D1 and are, for example, surfaces that are parallel to the CR plane. For example, the second surface 51c2 and the second surface 52c2 form a continuous surface that is perpendicular to the first direction D1 because the second surface 51c2 and the second surface 52c2 contact each other via the first surfaces 51c1 and 52c1. The second surface 52c2 of the second branch portion 52 and the second surface 51c2 of the first branch portion 51 of the segment conductor 50 that is adjacent in the negative C-direction are, for example, surfaces that are perpendicular to the first direction D1 and are, for example, surfaces that are parallel to the CR plane. For example, the second surface 52c2 and the second surface 51c2 form a continuous surface that is perpendicular to the first direction D1 because the second surface 52c2 and the second surface 51c2 contact each other via the first surfaces 52c1 and 51c1. The second surfaces 51c2 and 52c2 are continuous with a boundary WL interposed, and the contacting first surfaces 51c1 and 52c1 form the boundary WL when viewed along the first direction D1. For example, the boundary WL extends in the C-direction.

The third surfaces 51c3 and 52c3 are surfaces formed by cutting away the side surfaces of the weld portions 51c and 52c at the sides opposite to the boundary WL to reduce the surface areas of the second surfaces 51c2 and 52c2 and reduce the volume of the weld portion 51c. According to the embodiment, for example, the third surfaces 51c3 and 52c3 are parallel to the Z-direction and inclined with respect to the C-direction and the R-direction.

Specifically, the third surface 51c3 contacts the first surface 51c1 at the tip side of the segment conductor 50 and contacts the surface of the side surface 51bb of the inclined portion 51b at the inclined portion 51b side opposite to the first surface 51c1. Similarly, the third surface 52c3 contacts the first surface 52c1 at the tip side of the segment conductor 50 and contacts the surface of the side surface 51bb of the inclined portion 52b at the inclined portion 52b side opposite to the first surface 52c1. Thus, the third surfaces 51c3 and 52c3 are opposite to the first surfaces 51c1 and 52c1, approach the first surfaces 51c1 and 52c1 away from the inclined portion 51b, and contact the first surfaces 51c1 and 52c1 at the tips of the third surfaces 51c3 and 52c3.

The third surface 51c3 of the first branch portion 51 is a surface that is parallel to the third surface 52c3 of the second branch portion 52 of the other segment conductor 50 that is adjacent in the positive C-direction and is separated from the third surface 52c3 with the boundary WL interposed. The third surface 52c3 of the second branch portion 52 is a surface that is parallel to the third surface 51c3 of the first branch portion 51 of the other segment conductor 50 that is adjacent in the negative C-direction and is separated from the third surface 51c3 with the boundary WL interposed.

For easy processing such as welding, etc., of two segment conductors 50 to be welded, it is favorable for an angle α between the weld portion 51c and the inclined portion 51b of the first branch portion 51 of the segment conductor 50 (corresponding to an example of the first segment conductor) and the weld portion 52c and the inclined portion 52b of the second branch portion 52 of the segment conductor 50 that is adjacent in the positive C-direction (corresponding to an example of the second segment conductor) when viewed along the R-direction to be 60 degrees to 120 degrees, e.g., 90 degrees.

Figure 3:
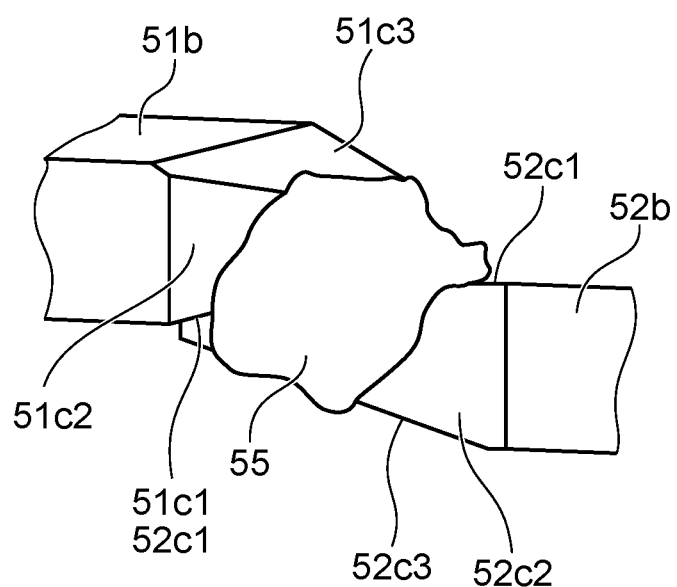
FIG. 3 is a perspective view showing segment conductors of the first embodiment after welding.

FIG. 3 is a perspective view showing segment conductors of the embodiment after welding. FIG. 3 is a drawing in which the weld portions of the two segment conductors 50 are viewed from substantially the Z-direction. As shown in FIG. 3, the segment conductors 50 are connected to each other by performing laser welding by using the center of the boundary WL of the second surfaces 51c2 and 52c2 that are a mutually continuous surface as the welding point. A welded metal portion 55 is formed from the weld portion 51c to the weld portion 52c by laser welding in which a portion of the weld portion 51c of the first branch portion 51 of one segment conductor 50 and a portion of the weld portion 52c of the second branch portion 52 of another segment conductor 50 are melted, and the melted metal solidifies.

The welded metal portion 55 is formed from the R-direction outer edge of the weld portion 51c of the one segment conductor 50 to the R-direction inner edge of the weld portion 52c of the other segment conductor 50. Specifically, in the one segment conductor 50, the welded metal portion 55 covers not less than half of the upper side of the first surface 51c1 and the second surface 51c2 at the inclined portion 52b side of the other segment conductor 50 and about half of the third surface 51c3 at the inclined portion 52b side of the other segment conductor 50. Therefore, the welded metal portion 55 contacts the first surface 51c1, the second surface 51c2, and the third surface 51c3 of the one segment conductor 50. Also, in the other segment conductor 50, the welded metal portion 55 covers not less than half of the upper side of the first surface 52c1 and the second surface 52c2 and not less than half of the third surface 52c3, and contacts the first surface 52c1, the second surface 52c2, and the third surface 52c3.

Thus, the multiple welded metal portions 55 electrically connect the one segment conductors 50 and the other segment conductors 50 that are adjacent to each other in the circumferential direction of the stator core 4. One ring-shaped coil 5 is formed by the welded metal portion 55 connecting the multiple segment conductors 50 arranged in the circumferential direction. In such a case, multiple coils 5 are arranged around the inner side of the stator core 4.

The segment conductor 50 can be formed from a material that has a high conductivity. For example, the segment conductor 50 can include copper.

A method for manufacturing the stator 2 according to the embodiment will now be described.

First, the stator core 4 is formed. For example, multiple plate-shaped magnetic members that include portions that become the yoke 41 and the multiple teeth 42 are formed. For example, the magnetic member can be formed by patterning by stamping an electrical steel sheet having a thickness of about 0.05 mm to 1.0 mm. Then, the multiple magnetic members are stacked, and the stator core 4 is formed by, for example, welding or caulking the multiple magnetic members. The stator core 4 also can be formed by press forming a magnetic material powder and a resin binder.

Then, the coil 5 is formed.

First, the multiple segment conductors 50 that are used as components of the coil 5 are formed.

FIGS. 4A to 4C are respectively a front view, a plan view, and a right side view showing the segment conductor before mounting in the stator core according to the embodiment. For example, as shown in FIGS. 4A to 4C, the segment conductor 50 can be formed by cutting away, for example, the rectangular wire that has a quadrilateral cross section at the second surfaces 51c2 and 52c2 and the third surfaces 51c3 and 52c3 beforehand, inserting the segment conductor 50 that is bent into a U-shape into the slots 43, and by bending the segment conductor 50 into a substantially U-shape such as that shown in FIGS. 2A and 2B in which the tips open outward. Or, the segment conductor 50 also can be formed by, for example, bending a rectangular wire that has a quadrilateral cross section into a U-shape, inserting the U-shape into the slots 43, bending the U-shape into a substantially U-shape that opens outward, and subsequently cutting away the second surfaces 51c2 and 52c2 and the third surfaces 51c3 and 52c3 as shown in FIGS. 2A and 2B. The rectangular wire also can be, for example, a so-called pure copper wire, and can be a wire that includes copper as a major component.

Then, each of the multiple segment conductors 50 is mounted in prescribed slots 43 of the stator core 4. For example, each of the multiple segment conductors 50 is inserted into the prescribed slots 43 along the axial direction of the stator core 4 (the Z-direction in FIG. 1). In such a case, as shown in FIG. 2A as well, one segment conductor 50 is inserted to straddle multiple slots 43.

Figure 5A:
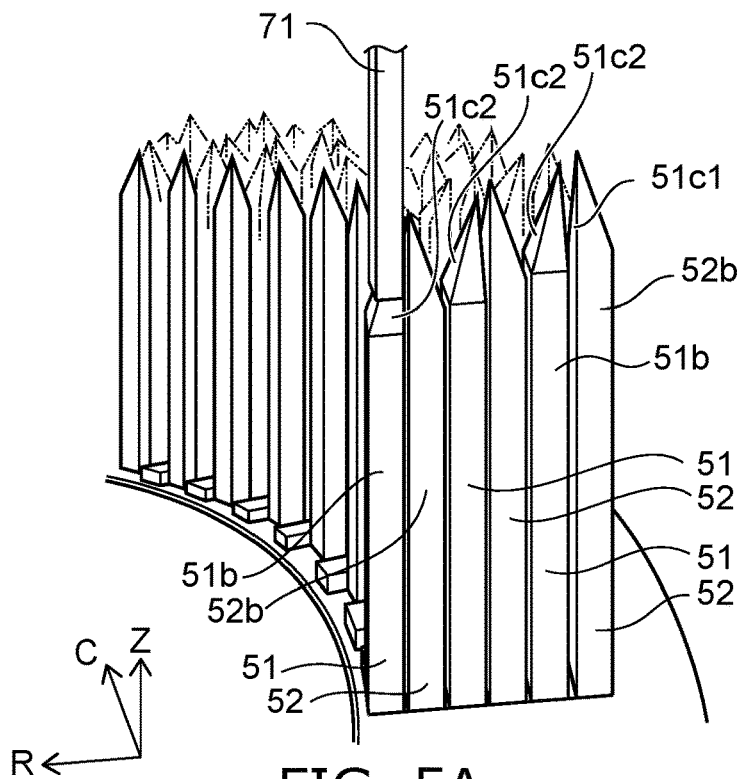
FIG. 5A is a perspective view showing a process of mounting and bending a portion of the segment conductors in the stator core according to the first embodiment.
Figure 5B:
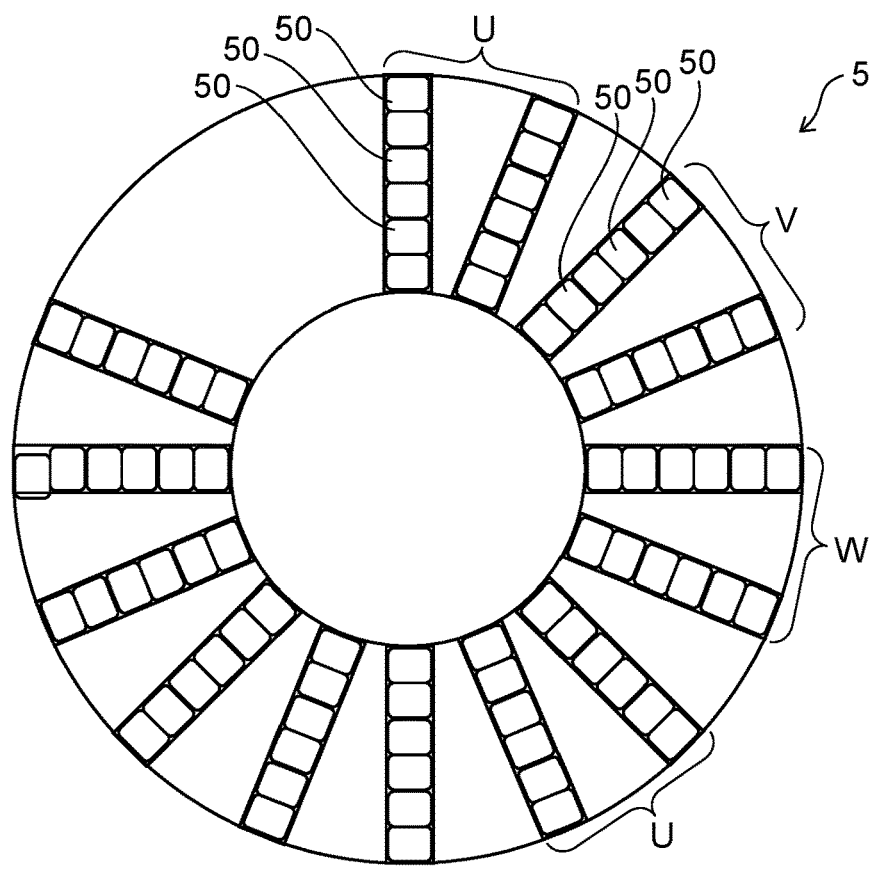
FIG. 5B is a top view showing the arrangement of the segment conductors after the bending.

FIG. 5A is a perspective view showing a process of mounting and bending a portion of the segment conductors 50 of the stator core 4. FIG. 5B is a top view showing the arrangement of the segment conductors after the bending. Outward bends of, for example, 45 degrees each with respect to the link portion 53 are formed between the fixed portions 51a and 52a and the inclined portions 51b and 52b of the multiple segment conductors 50. For convenience of illustration, FIG. 5A shows only the second branch portion 52 at one frontward location among the innermost arrangements of the second branch portions 52. Therefore, the first branch portions 51 are arranged in the column at the innermost side shown in FIG. 5A; and the second branch portions 52 are arranged in the column at the outer side of this column. The first branch portions 51 are arranged in the column at the outer side of this column, and the second branch portions 52 are arranged in the column further at the outer side. The first branch portions 51 are arranged in the column further at the outer side; and the second branch portions 52 are arranged in the column further at the outer side.

The second branch portions 52 are bent in the positive C-direction in order from the endmost second branch portions 52 in the positive C-direction to expose the second surfaces 52c2 of the second branch portions 52 upward so that the second surfaces 52c2 are not concealed after the bending. Similarly, the first branch portions 51 are bent in the negative C-direction in order from the endmost first branch portions 51 in the negative C-direction to expose the second surfaces 51c2 of the first branch portions 51 upward without concealing the second surfaces 51c2. A jig 71 that can clamp and bend the tips of the first and second branch portions 51 and 52 as shown in FIG. 5A may be used in the bending.

After the bending as shown in FIG. 5B, for example, the coils 5 that are included in the multiple phases of the U-phase, the V-phase, and the W-phase are arranged at the upper end of the stator core 4. For the first and second branch portions 51 and 52 of the segment conductors 50 at the upper surface shown in FIG. 5B, the first surfaces 51c1 and 52c1 face and contact each other; the second surfaces 51c2 and 52c2 form a continuous surface with the boundary WL interposed; and the third surfaces 51c3 and 52c3 are separated and parallel to each other. The third surfaces 51c3 and 52c3 are surfaces that approach the first surfaces 51c1 and 52c1 away from the side surfaces 51bb and 52bb of the inclined portions 51b and 52b. Thereby, spaces 81 can be formed at the sides of the third surfaces 51c3 and 52c3. The inclined portions 51b and 52b of the other segment conductors 50 that are adjacent in the C-direction as viewed from the space 81 are positioned lower than the second surfaces 51c2 and 52c2 and the third surfaces 51c3 and 52c3.

Figure 6:
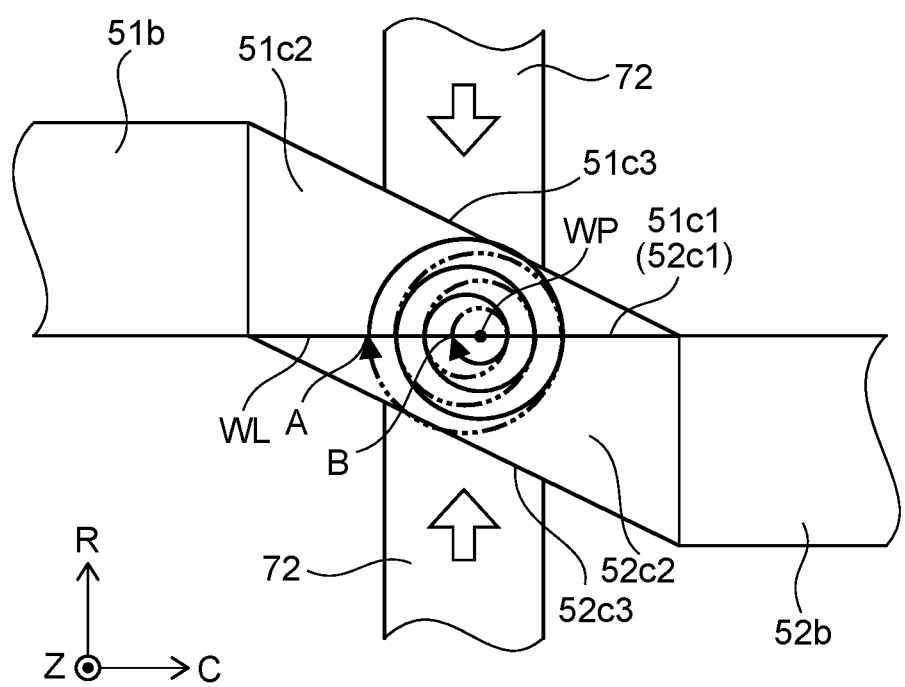
FIG. 6 is a plan view showing a weld portion and a portion of inclined portions of the segment conductors after bending according to the first embodiment.

Then, welding is performed. FIG. 6 is a plan view showing the weld portion and portions of inclined portions of segment conductors after the bending. The second surface 51c2 of the first branch portion 51 of one segment conductor 50 and the second surface 52c2 of the second branch portion 52 of the other segment conductor 50 that is adjacent in the circumferential direction form a continuous surface with the boundary WL interposed. The welding is performed by laser welding. The irradiation position of the laser is moved in a spiral shape in a circular region of the second surfaces 51c2 and 52c2. The center of the circular region on which the laser is irradiated is taken as a welding point WP. The welding point WP is set to substantially the center of the boundary WL. For example, laser irradiation is performed to turn in an inward spiral clockwise from an irradiation start point A located on WL that is arranged with the welding point WP; the irradiation turns in an outward spiral clockwise when an irradiation turn-around point B is reached; and the laser irradiation ends when the irradiation start point A is reached.

When laser welding, a jig 72 that presses in directions to cause the third surfaces 51c3 and 52c3 to approach each other may press so that the first surfaces 51c1 and 52c1 can continue to contact each other and the second surfaces 51c2 and 52c2 can continue to contact each other without separating. Thereby, the welded metal portion 55 is formed to have the welding point WP as the center; and the two segment conductors 50 are welded to each other. Thus, the ring-shaped coil 5 is made by sequentially welding the weld portion 51c of the first branch portion 51 of one segment conductor 50 and the weld portion 52c of the second branch portion 52 of another segment conductor 50 that is adjacent in the circumferential direction. The multiple coils 5 are made by welding the multiple segment conductors 50 arranged in each of the U-phase, the V-phase, and the W-phase.

According to the embodiment, the second surfaces 51c2 and 52c2 and the third surfaces 51c3 and 52c3 of the weld portions 51c and 52c are not limited to being cut away beforehand in the state of the rectangular wire before the bending of the inclined portions 51b and 52b; for example, the cutting may be performed after disposing in the stator core 4 and/or after the bending of the inclined portions 51b and 52b. Also, the welding is not limited to the welding method of the embodiment. For example, the welding is not limited to the spiral irradiation of a laser and may be an irradiation on one point.

Effects of the first embodiment will now be described.

The surface areas of the second surfaces 51c2 and 52c2 at the portions having the boundary WL interposed can be reduced by forming the third surfaces 51c3 and 52c3 by cutting away portions of the weld portions 51c and 52c that are separated from the boundary WL. Hereinbelow, the regions of the second surfaces 51c2 and 52c2 positioned at the two R-direction sides of the boundary WL are called the "weld region"; the surface area of the weld region is called the "weld area"; and the volume of the portions of the weld portions 51c and 52c positioned directly under the weld region is called the "weld volume". By reducing the weld area, the diffusion of the heat from the welding point WP in the planar direction (the RC plane) can be prevented, and the heat can be efficiently conducted in the Z-direction; as a result, the welded metal portion can be increased. Also, the weld volume can be reduced by reducing the weld area.

By reducing the weld volume, the diffusion of the heat from the irradiation position of the laser in the planar direction (the RC plane) can be suppressed, and the heat can be concentrated in a small volume. Therefore, the portions of the weld portions 51c and 52c that reach temperatures that are not less than the melting point can be increased, and the welded metal portion 55 can be formed to be wide to reach the first surfaces 51c1 and 52c1, the second surfaces 51c2 and 52c2, and the third surfaces 51c3 and 52c3. As a result, the resistance value of the weld portions 51c and 52c can be stabilized, and the strength of the welding spot can be guaranteed.

Also, the spaces 81 are formed at the sides of the weld portions 51c and 52c by forming the third surfaces 51c3 and 52c3 by cutting away the sides of the weld portions 51c and 52c; therefore, it is easier for jigs for processing the weld portions 51c and 52c and the inclined portions 51b and 52b, attachments of automatic machines, etc., to enter the spaces 81. Therefore, the manufacturability is good.

Furthermore, the length in the Z-direction of the coil 5 can be reduced by forming the first surfaces 51c1 and 52c1 and the second surfaces 51c2 and 52c2 of the weld portions 51c and 52c to be lower than the extension planes of the side surfaces 51bb and 52bb of the inclined portions 51b and 52b.

Effects of the weld area on the volume of the welded metal portion 55 and the range of the thermal effects will now be described using test examples. From the perspective of comparison, the heat amount that was input by the welding for the two was the same.

Figure 7A:
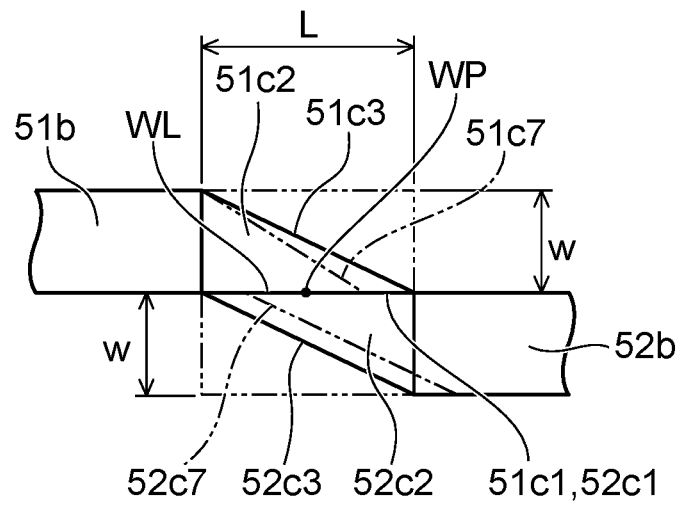
FIG. 7A is a plan view showing the weld portion of the first embodiment before welding.
Figure 7B:
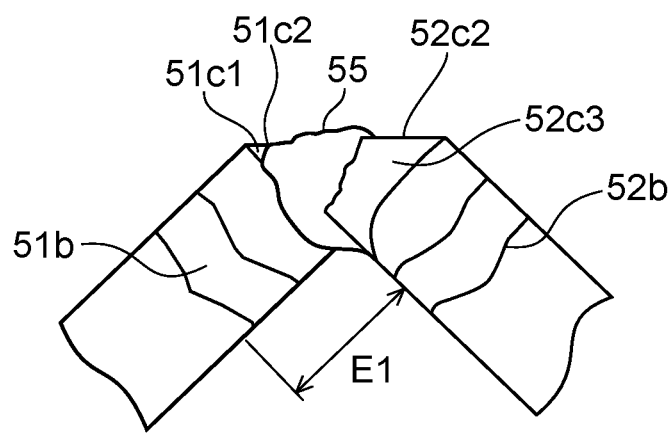
FIG. 7B is a front view showing the weld portion of the first embodiment after welding.

FIG. 7A is a plan view showing the weld portions 51c and 52c of the embodiment before welding, and shows the weld area that is reduced due to the third surfaces 51c3 and 52c3. FIG. 7B is a front view showing the weld portions 51c and 52c after welding, and shows a thermal effect range E1. According to the embodiment, the third surfaces 51c3 and 52c3 are formed at positions that cross the first surfaces 51c1 and 52c1 at the tip edges of the weld portions 51c and 52c. The distances between the third surfaces 51c3 and 52c3 and the first surfaces 51c1 and 52c2 at the tips of the weld portions 51c and 52c are 0. In such a case, the weld area that is reduced by forming the third surfaces 51c3 and 52c3 is (wL/2), where w is the length in the diametrical direction R of the weld portion 51c, and L is the length in the circumferential direction C. In such a case, the welded metal portion 55 is formed to be large over the upper surface and lower surface from the middle to the tip of the weld portion 52c when viewed in front-view. The range E1 that discolored due to the thermal effect of the laser welding was, for example, 4.8 mm.

Figure 8A:
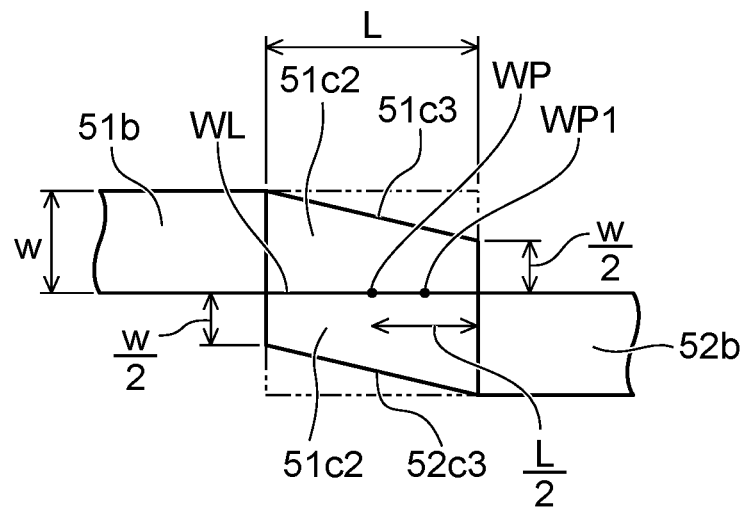
FIG. 8A is a plan view showing when the positions of the third surfaces of the first embodiment are shifted.
Figure 8B:
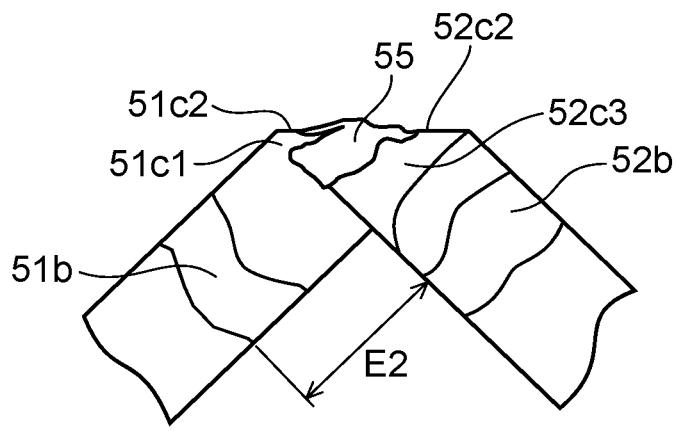
FIG. 8B is a front view showing the state of the segment conductors shown in FIG. 8A after welding.

FIG. 8A is a plan view showing when the positions of the third surfaces 51c3 and 52c3 according to the embodiment are shifted. FIG. 8B is a front view showing the state after welding the segment conductors shown in FIG. 8A, and shows a thermal effect range E2. In the first branch portion 51 of the example shown in FIG. 8A, the third surface 51c3 is separated from the first surface 51c1; and the shortest distance between the third surface 51c3 and the first surface 51c1 is (w/2). This is similar for the second branch portion 52 as well. In such a case, the weld area that is reduced by forming the third surfaces 51c3 and 52c3 is (wL/4), and is half of the reduction amount of the weld area shown in FIG. 7A. As shown in FIG. 8B, the welded metal portion 55 also is formed over the upper surface and lower surface in a range from the middle to the tip of the weld portion 52c when viewed in front-view; the tip of the weld portion 51c melted, and the first surface 51c1 of the first branch portion 51 is visible; however, the welded metal portion 55 is smaller than the welded metal portion 55 shown in FIG. 7B. In FIG. 8B, the thermal effect range E2 is, for example, 5.3 mm, and is equivalent to the thermal effect range E1 shown in FIG. 7B.

In the test example described above, the welding was efficiently performed by increasing the amount of the weld area reduced by the third surfaces 51c3 and 52c3. Specifically, as the reduction amount of the weld area is increased and the reduction amount of the weld volume is increased, the welded metal portion 55 could be formed to be large, and the weld portions 51c and 52c could be widely covered. The strength of the weld portions 51c and 52c can be guaranteed thereby, and the electrical resistance value of the weld portions 51c and 52c can be reduced. Also, if the reduction amount of the weld area can be increased, the spaces 81 that are formed thereby can be wide, and the spaces can be effectively utilized as described above.

According to the embodiment as shown in FIGS. 7A and 8A, an example is shown in which the shortest distances between the third surfaces 51c3 and 52c3 and the first surfaces 51c1 and 52c1 are 0 or (w/2); however, this is not limited thereto; it is sufficient to reduce the weld area by cutting away the side portions of the weld portions 51c and 52c at the third surfaces 51c3 and 52c3. For example, as shown in FIG. 7A, a third surface 51c7 may be further inclined with respect to the circumferential direction C; and a third surface 52c7 may be shifted toward the inclined portion 52b side. In such a case, the second surfaces 51c2 and 52c2 become even smaller, the contact area of the first surfaces 51c1 and 52c1 is reduced, and the boundary WL also is shorter. The weld area and the weld volume are further reduced thereby.

The shape of the welded metal portion 55 changes according to the heat amount input to the welding, the shortest distances between the boundary WL and the third surfaces 51c3 and 52c3, the position of the welding point WP, etc.; and the range of the first surfaces 51c1 and 52c1, the second surfaces 51c2 and 52c2, and the third surfaces 51c3 and 52c3 reached by the welded metal portion 55 also changes. For example, as shown in FIG. 8A, when the shapes of the weld portions 51c and 52c are quadrilateral truncated pyramid shapes and the lengths in the Z-direction of the tip edges of the third surfaces 51c3 and 52c3 are (w/2), the distances from the boundary WL to the third surfaces 51c3 and 52c3 are greater than those of the example shown in FIG. 7A. Also, when the welding point is shifted to the position of a welding point WP1, the distance from the welding point WP1 to the third surface 52c3 of the second branch portion 52 undesirably lengthens, the distance from the welding point WP1 to the third surface 51c3 of the first branch portion 51 becomes short, and the length from the welding point WP1 to the tip surface of the weld portion 51c of the first branch portion 51 becomes short.

In such a case, while being different according to the input heat amount, there are also cases where the welded metal portion 55 reaches the third surface 51c3 of the first branch portion 51, but the welded metal portion 55 does not reach the third surface 52c3 of the second branch portion 52 for which the length from the welding point WP1 is large. To ensure the strength of the welding spot, it is sufficient for the welded metal portion 55 to reach at least one of the third surfaces 51c3 and 52c3.

Comparative Examples

Figure 9A:
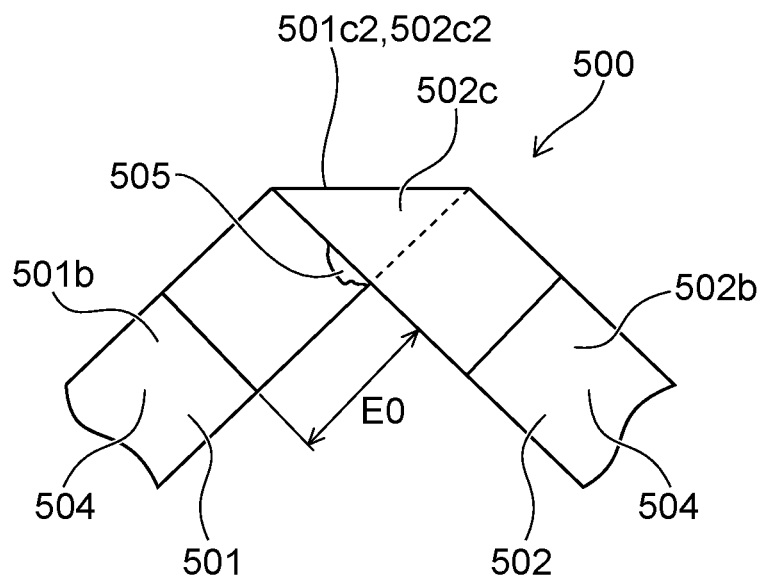
FIG. 9A is a partial plan view showing segment conductors of a comparative example 1.

A comparative example 1 and a comparative example 2 will now be described. FIG. 9A is a partial plan view showing segment conductors of the comparative example 1 in which the third surfaces are not provided; and FIG. 9B is a partial front view of the segment conductors.

Figure 9B:
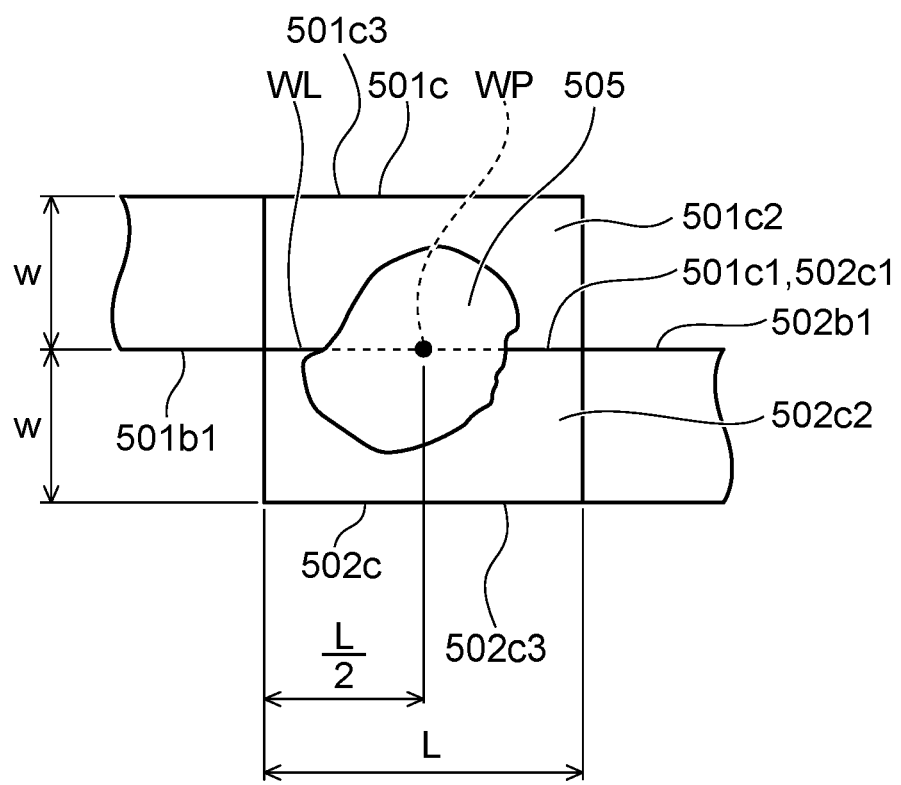
FIG. 9B is a partial front view of the segment conductors.

As shown in FIGS. 9A and 9B, the segment conductors 500 of the comparative example 1 differ from those of the first embodiment in that the third surfaces 51c3 and 52c3 are not formed. In other words, in the segment conductors 500, second surfaces 501c2 and 501c2 that form the weld region are rectangular regions surrounded with the edge of the second surface 501c2 of a first branch portion 501 of one segment conductor 500 at an inclined portion 501b side, the edge of a second surface 502c2 of a second branch portion 502 of the other segment conductor 500 at an inclined portion 502b side, and extension planes of two side surfaces 501bb of the inclined portion 501b of the second surface 501c2 of the first branch portion 501. The surface areas of the second surfaces 501c2 and 502c2 are wL which is 2 times the surface areas of the second surfaces 51c2 and 52c2 (wL/2) according to the first embodiment shown in FIG. 7A; and the weld volume also is not reduced.

When the segment conductors 500 according to the comparative example are welded to each other by inputting the same heat amount as the test examples shown in FIGS. 7B and 8B described above, a welded metal portion 505 is small compared to the welded metal portion 55 of the first embodiment, and is formed only at first surfaces 501c1 and 502c1 and the second surfaces 501c2 and 502c2. A thermal effect range E0 is, for example, 4.9 mm; and a significant difference compared to the thermal effect ranges E1 and E2 of the embodiment was not confirmed.

It may be considered to increase the welding heat amount to increase the welded metal portion 55 and form the welded metal portion 55 to side surfaces 501c3 and 502c3 that are opposite to the first surfaces 501c1 and 502c1. However, in the comparative example, the weld area and the weld volume are large, and the lengths from the welding point WP to the side surfaces 501c3 and 502c3 are long; therefore, the increase amount of the heat amount undesirably becomes quite large. Thereby, much melting of weld portions 501c and 502c occurs due to the welding; the thermal effect range E0 becomes drastically large; and there is a possibility that an insulative coating film 504 that covers the inclined portions 501b and 502b may be severely damaged, making it difficult to guarantee the insulation properties.

Figure 10:
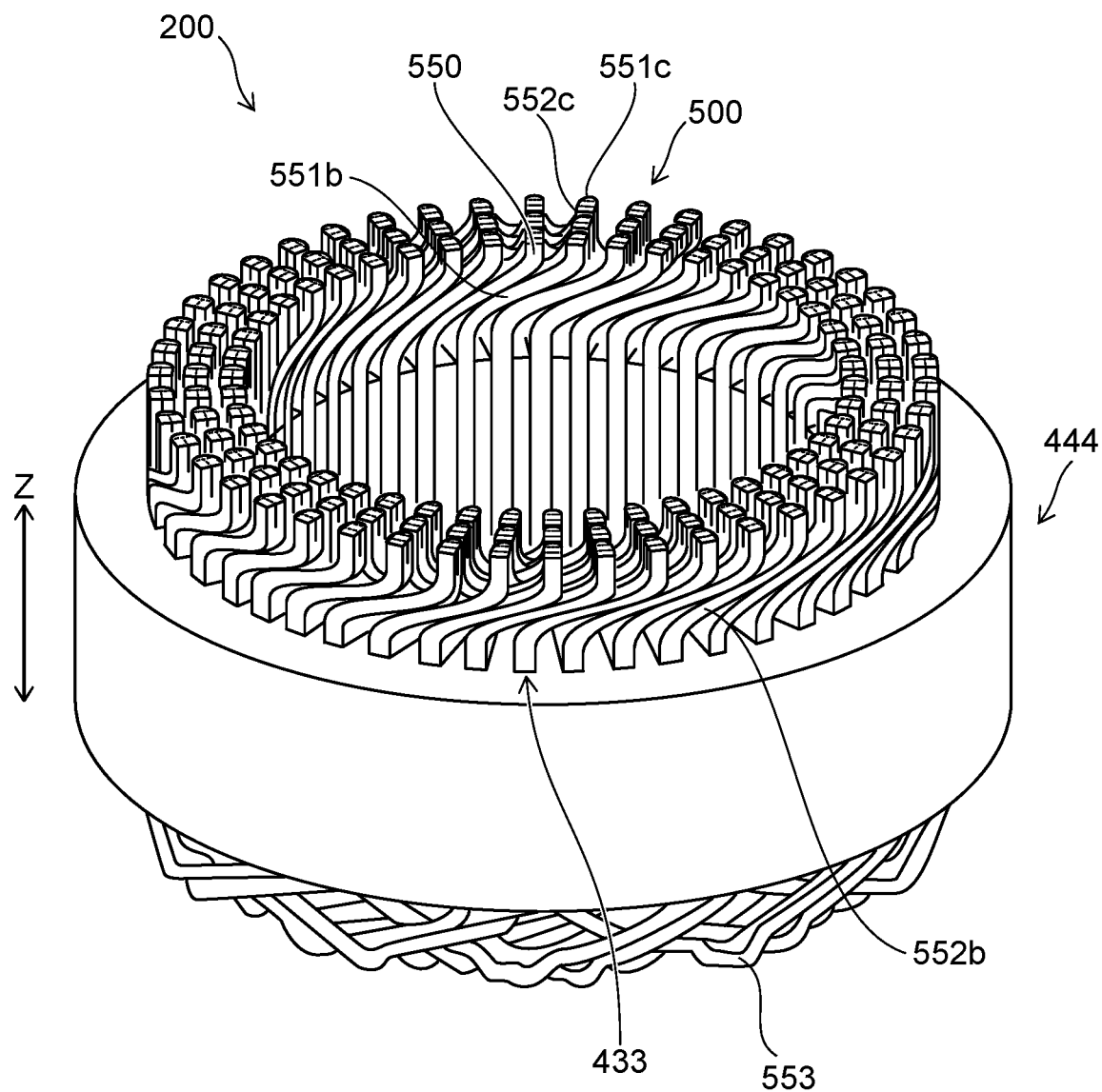
FIG. 10 is a perspective view showing a stator of a comparative example 2.

FIG. 10 is a perspective view showing a stator 200 of the comparative example 2. The stator 200 includes a stator core 444 in which multiple slots 433 are formed; and multiple segment conductors 550 are inserted into the multiple slots 433. Compared to the comparative example 1, weld portions 551c and 552c are formed to tilt upward in the Z-direction from inclined portions 551b and 552b. Therefore, compared to the embodiment, a height reduction of the coil 500 cannot be realized.

Second Embodiment

Figure 11A:
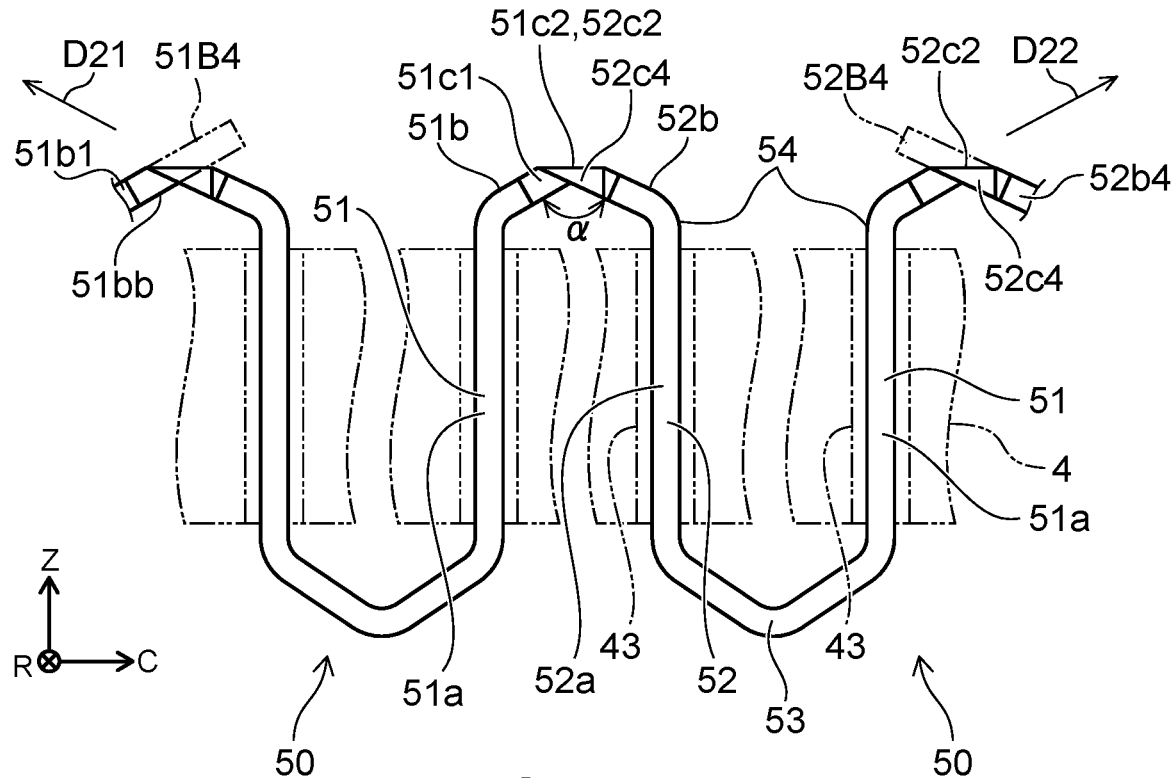
FIG. 11A is a partial cross-sectional view showing a coil according to a second embodiment.
Figure 11B:
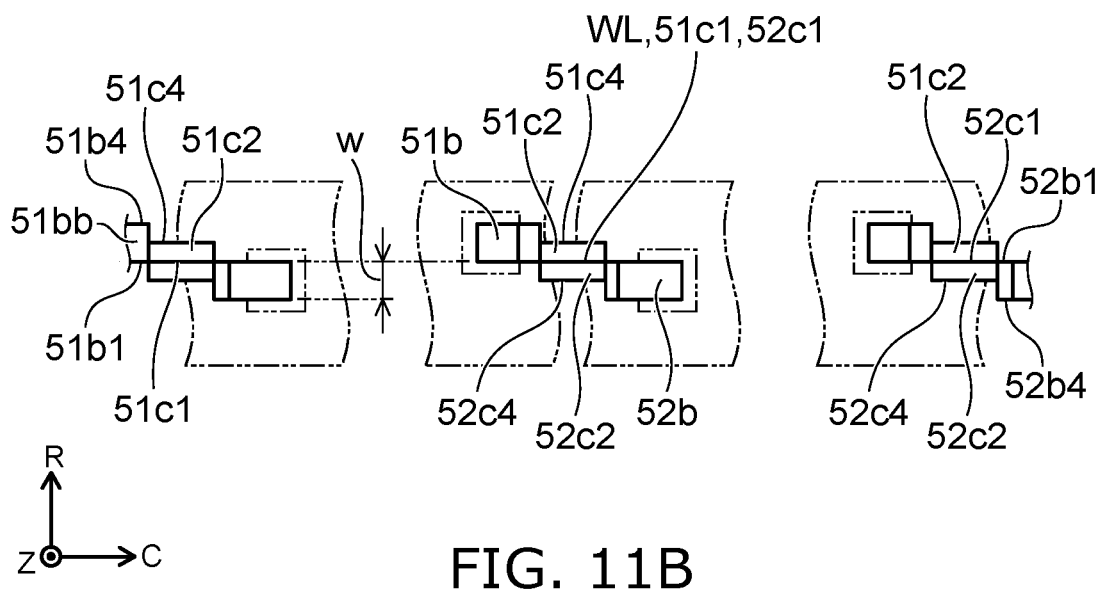
FIG. 11B is a partial plan view of the coil.
Figure 13:
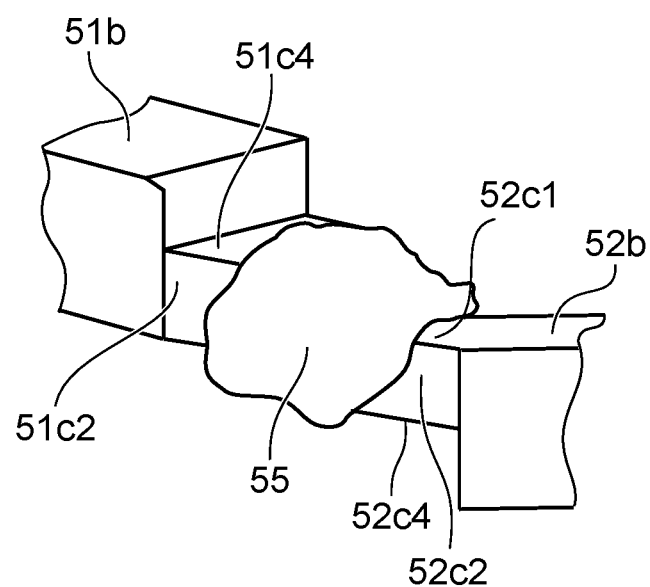
FIG. 13 is a perspective view showing the segment conductor after welding according to the second embodiment.

FIGS. 11A and 11B are respectively a partial cross-sectional view and a partial plan view showing a coil according to the embodiment. FIGS. 12A to 12C are respectively a front view, a plan view, and a right side view showing a segment conductor before mounting in the stator core according to the embodiment. FIG. 13 is a perspective view showing segment conductors according to the embodiment after welding.

In the coil 5 according to the embodiment as shown in FIGS. 11A to 12C, a third surface 51c4 of the weld portion 51c of the first branch portion 51 of the segment conductor 50 is located between the first surface 51c1 of the weld portion 51c and an extension plane 51B4 of a side surface 51b4 of the inclined portion 51b that is separated from the first surface 51c1 of the weld portion 51c. For example, the third surface 51c4 is parallel to the first surface 51c1 and does not contact the side surface 51b4.

Similarly, a third surface 52c4 of the weld portion 52c of the second branch portion 52 of the segment conductor 50 is located between the first surface 52c1 of the weld portion 52c and an extension plane 52B4 of a side surface 52b4 of the inclined portion 52b that is separated from the first surface 52c1 of the weld portion 52c. For example, the third surface 52c4 is parallel to the first surface 52c1 and does not contact the side surface 52b4.

According to the embodiment, the distance between the third surface 51c4 and the third surface 52c4 that are opposite to each other with the boundary WL interposed is less than the distance between the extension plane 51B4 of the side surface 51b4 and the extension plane 52B4 of the side surface 52b4. Therefore, compared to the comparative example 1 described above, the weld area can be reduced, and the weld volume can be reduced.

As shown in FIG. 13, the diffusion of the input heat when welding can be suppressed thereby, and the welded metal portion 55 can be formed to be large. The welded metal portion 55 contacts the first surfaces 51c1 and 52c1 and the second surfaces 51c2 and 52c2, and further contacts at least one, e.g., both, of the third surfaces 51c4 and 52c4. Also, compared to the comparative example 2 described above, the protrusion amount of the segment conductor 50 from the stator core 4 in the Z-direction can be suppressed, and the length in the Z-direction of the stator 2 can be reduced. In other words, a height reduction of the stator 2 can be realized. Otherwise, the configuration, the operations, and the effects of the embodiment are similar to those of the first embodiment.

Third Embodiment

Figure 14A:
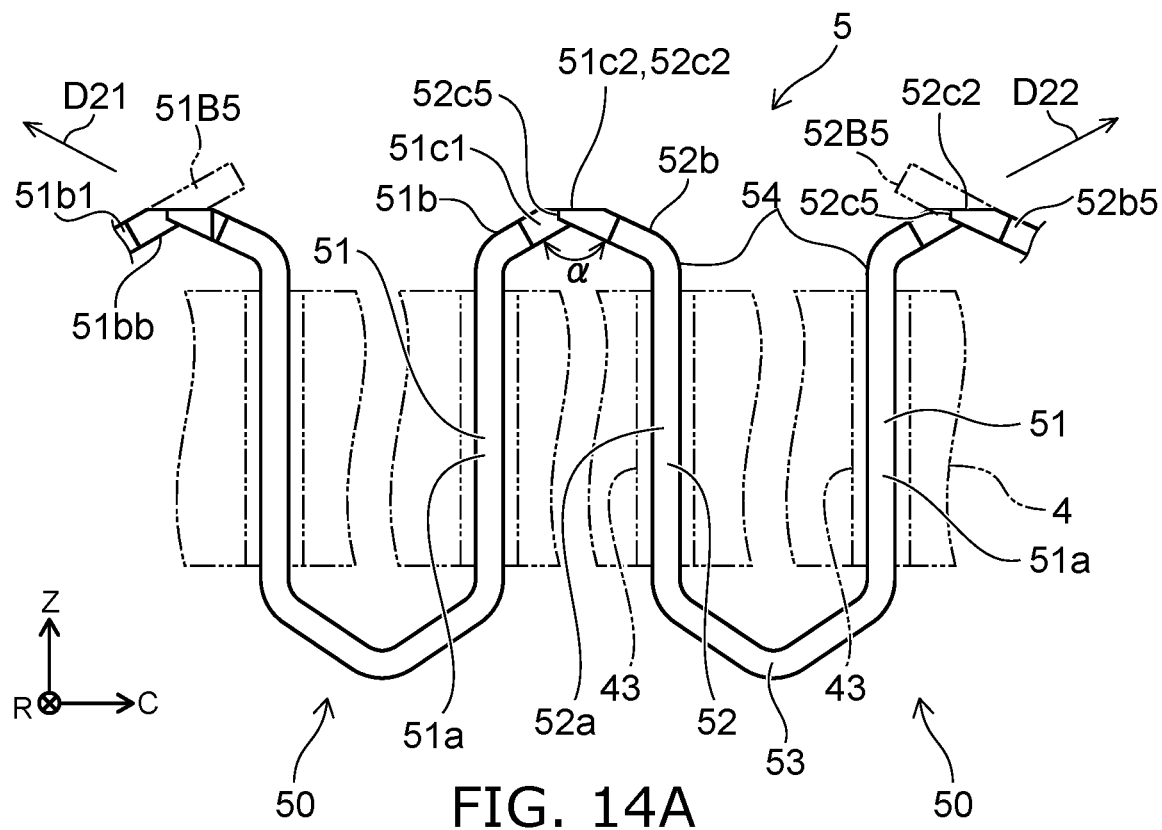
FIG. 14A is a partial cross-sectional view showing a coil according to a third embodiment.
Figure 14B:
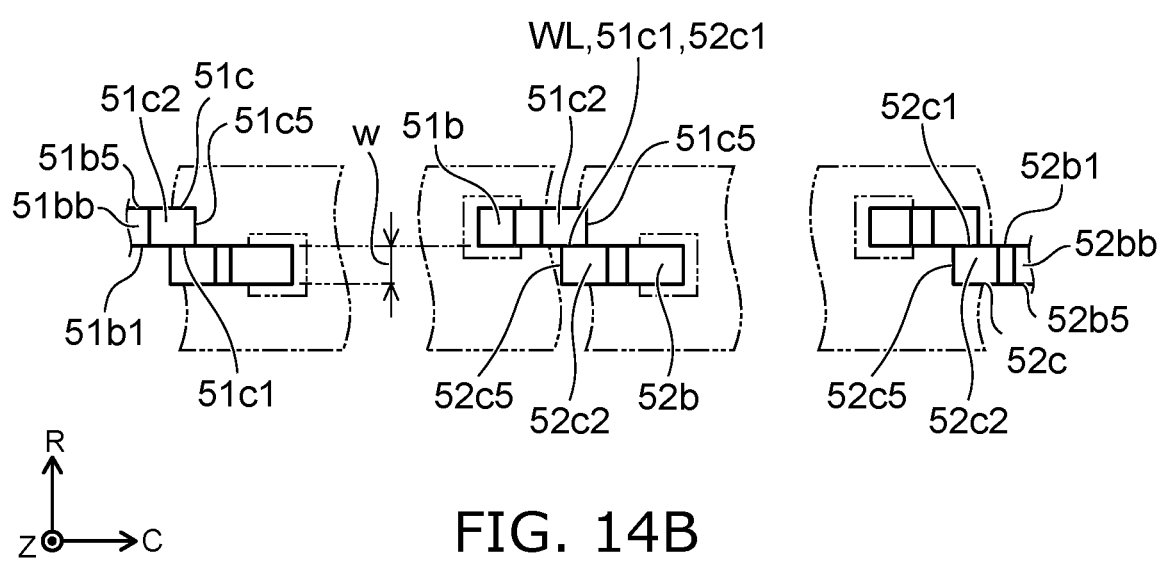
FIG. 14B is a partial plan view of the coil.
Figure 16:
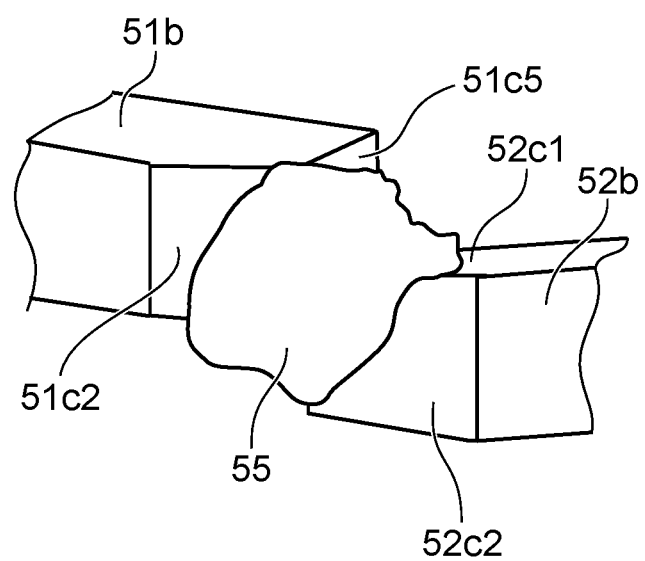
FIG. 16 is a perspective view showing segment conductors after welding according to the third embodiment.

FIGS. 14A and 14B are respectively a partial cross-sectional view and a partial plan view showing a coil according to the embodiment. FIGS. 15A to 15C are respectively a front view, a plan view, and a right side view showing segment conductors before mounting in the stator core according to the embodiment. FIG. 16 is a perspective view showing each of the segment conductors according to the embodiment after welding.

In the coil 5 according to the embodiment as shown in FIGS. 14A to 15C, for example, a third surface 51c5 of the weld portion 51c of the first branch portion 51 of the segment conductor 50 is formed by cutting away the tip of the weld portion 501c of the comparative example 1. Specifically, the third surface 51c5 is formed by cutting off the tip of the first surface 501c1 and the tip of the second surface 501c2 of the comparative example 1. Accordingly, the third surface 51c5 is, for example, a surface that crosses the first and second surfaces 51c1 and 51c2 and contacts the first and second surfaces 51c1 and 51c2.

Similarly, for example, a third surface 52c5 of the weld portion 52c of the second branch portion 52 of the segment conductor 50 is formed by cutting away the tip of the weld portion 502c of the comparative example 1. Specifically, the third surface 52c5 is formed by cutting off the tip of the first surface 502c1 and the tip of the second surface 502c2 of the comparative example 1. Accordingly, the third surface 52c5 is, for example, a surface that crosses the first and second surfaces 52c1 and 52c2 and contacts the first and second surfaces 52*c*1 and 52*c*2. For example, the third surfaces 51*c*5 and 52*c*5 are parallel to the RZ plane.

The third surface 51*c*5 is a surface that connects the first surface 51*c*1 and an extension plane of a side surface 51*b*5 of the inclined portion 51*b* that is separated from the first surface 51*c*1, and is a surface that is separated from the edge of the other second surface 52*c*2 at the inclined portion 52*b* side. Similarly, the third surface 52*c*5 is a surface that connects the first surface 51*c*1 and an extension plane 52B5 of a side surface 52*b*5 of the inclined portion 52*b* that is separated from the first surface 52*c*1, and is a surface that is separated from the edge of the other second surface 51*c*2 at the inclined portion 51*b* side.

According to the embodiment, the distance between the third surface 51*c*5 and the third surface 52*c*5 that are located with the boundary WL interposed at the crossing position is less than the distance between the tip edge of the second surface 501*c*2 and the tip edge of the second surface 502*c*2 of the comparative example 1 that is the shape before cutting away. Therefore, compared to the comparative example 1 described above, the weld area can be reduced, and the weld volume can be reduced.

Also, the contact area of the first surface 51*c*1 and the first surface 52*c*1 can be reduced, and the boundary WL can be shortened. Therefore, when welding at the welding point WP at substantially the center of the boundary WL, the spreading of the heat in the planar direction from the welding point WP in the weld area can be suppressed, and the heat can be efficiently conducted in the Z-direction at the welding point WP. As shown in FIG. 16, the diffusion of the input heat when welding can be suppressed thereby, and the welded metal portion 55 can be formed to be large. The welded metal portion 55 contacts the first surfaces 51*c*1 and 52*c*1 and the second surfaces 51*c*2 and 52*c*2, and further contacts at least one, e.g., both, of the third surfaces 51*c*5 and 52*c*5.

Otherwise, the configuration, the operations, and the effects according to the embodiment are similar to those of the first embodiment.

Modification of Third Embodiment

Figure 17A:
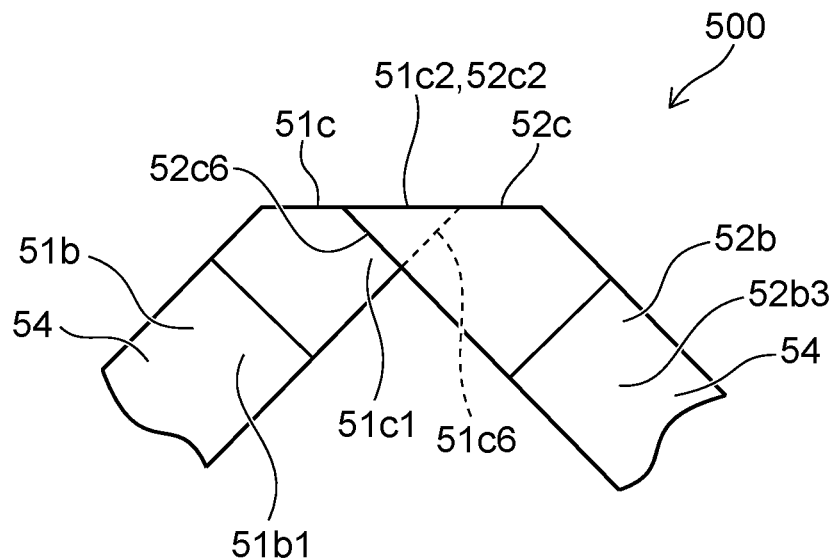
FIG. 17A is a front view showing a weld portion according to a modification of the third embodiment before welding.
Figure 17B:
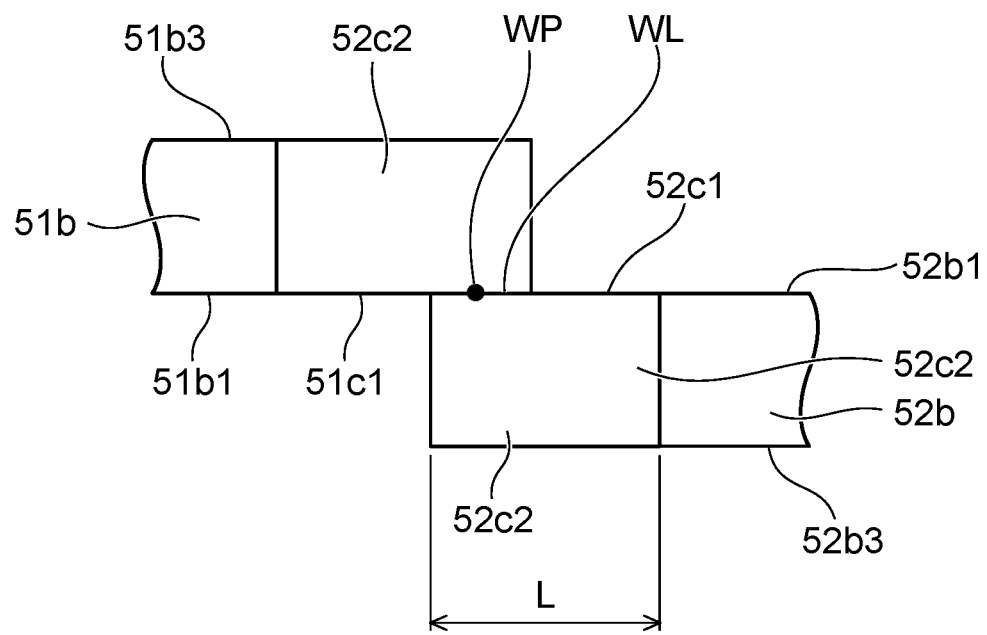
FIG. 17B is a plan view of the weld portion.

A modification of the third embodiment will now be described. FIGS. 17A and 17B are a front view and a plan view showing weld portions of the modification of the third embodiment before welding. According to the third embodiment, the third surfaces 51*c*5 and 52*c*5 are formed by cutting away the tips of the weld portions 51*c* and 52*c*; however, according to the modification as shown in FIGS. 17A and 17B, the bending of the weld portions 51*c* and 52*c* is performed so that the weld portions 51*c* and 52*c* are in a state of being shifted away from each other in directions in the circumferential direction (the C-direction). In other words, the tip edge of the second surface 51*c*2 and the tip edge of the second surface 52*c*2 approach each other.

In such a case, a counter surface 51*c*6 of the second surface 51*c*2 (the surface corresponding to the third surface) is a surface that connects the first surface 51*c*1 and an extension plane of a side surface 51*b*3 that is separated from the first surface 51*c*1, and is a surface that is separated from the edge of the other second surface 52*c*2 at the inclined portion 52*b* side. The counter surface 51*c*6 is a surface that is inclined with respect to the second surface 51*c*2, approaches the second surface 51*c*2 toward the tip edge of the second surface 51*c*2, and contacts the second surface 51*c*2. Similarly, a counter surface 52*c*6 of the second surface 52*c*2 (the surface corresponding to the third surface) is a surface that connects the first surface 52*c*1 and an extension plane of a side surface 52*b*3 that is separated from the first surface 52*c*1, and is a surface that is separated from the edge of the other second surface 51*c*2 at the inclined portion 51*b* side. The counter surface 52*c*6 is a surface that is inclined with respect to the second surface 52*c*2, approaches the second surface 52*c*2 toward the tip edge of the second surface 52*c*2, and contacts the second surface 52*c*2.

Similarly to the third embodiment, the contact area between the first surfaces 51*c*1 and 52*c*1 can be reduced thereby, and the boundary WL can be shortened. The weld area and the weld volume can be reduced thereby, and the heat can be concentrated in a small weld volume.

Otherwise, the configuration, the operations, and the effects of the modification are similar to those of the third embodiment.

While certain embodiments have been described, these embodiments have been presented by way of example only, and are not intended to limit the scope of the inventions. The novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such embodiments or their modifications as would fall within the scope and spirit of the inventions. Also, embodiments described above can be implemented in combination with each other.

What is claimed is:

1. A coil, comprising:
   a first segment conductor;
   a second segment conductor; and
   a welded metal portion at which the first and second segment conductors are welded,
   the first segment conductor and the second segment conductor each including
   a fixed portion held in a stator core, the fixed portion extending in a first direction,
   an inclined portion protruding from the stator core and extending in a second direction inclined with respect to the first direction, the inclined portion including side surfaces covered with a coating film, the coating film being insulative, and
   a weld portion located at a tip of the inclined portion, the weld portion not being covered with the coating film, the weld portion including
   a first surface located within an extension plane in the second direction of one surface of the side surfaces,
   a second surface contacting the first surface, and
   a third surface contacting the second surface,
   the first surface of the first segment conductor contacting the first surface of the second segment conductor,
   the second surface of the first segment conductor and the second surface of the second segment conductor forming a continuous surface,
   the third surface of the first segment conductor being separated from the third surface of the second segment conductor, and
   the welded metal portion contacting the first, second, and third surfaces of the first segment conductor and contacting the first and second surfaces of the second segment conductor, wherein
   when viewed along the first direction, a surface area of the second surface of the first segment conductor is less than a surface area of a region surrounded with an edge of the second surface of the first segment conductor at the inclined portion side, an edge of the second surface of the second segment conductor at the inclined portion side, and extension planes of the side surfaces of the inclined portion of the first segment conductor.

2. The coil according to claim 1, wherein
the third surface approaches the first surface away from the inclined portion.

3. The coil according to claim 1, wherein
the third surface is located between the first surface and an extension plane of a side surface among the side surfaces of the inclined portion that is separated from the first surface.

4. The coil according to claim 1, wherein
an angle between the second surface and the second direction is less than an angle between the second surface and the first direction.

5. A dynamo-electric machine, comprising:
a stator; and
a rotor located inside the stator,
the stator including
the stator core; and
the coil according to claim 1.

6. A coil, comprising:
a first segment conductor;
a second segment conductor; and
a welded metal portion at which the first and second segment conductors are welded,
the first segment conductor and the second segment conductor each including
a fixed portion held in a stator core, the fixed portion extending in a first direction,
an inclined portion protruding from the stator core and extending in a second direction inclined with respect to the first direction, the inclined portion including side surfaces covered with a coating film, the coating film being insulative, and
a weld portion located at a tip of the inclined portion, the weld portion not being covered with the coating film, the weld portion including
a first surface located within an extension plane in the second direction of one surface of the side surfaces,
a second surface contacting the first surface, and
a third surface contacting the first and second surfaces, the first surface of the first segment conductor contacting the first surface of the second segment conductor,
the second surface of the first segment conductor and the second surface of the second segment conductor forming a continuous surface, and
the welded metal portion contacting the first, second, and third surfaces of the first segment conductor and contacting the first and second surfaces of the second segment conductor, wherein
when viewed along the first direction, a surface area of the second surface of the first segment conductor is less than a surface area of a region surrounded with an edge of the second surface of the first segment conductor at the inclined portion side, an edge of the second surface of the second segment conductor at the inclined portion side, and extension planes of the side surfaces of the inclined portion of the first segment conductor.

7. The coil according to claim 6, wherein
an angle between the second surface and the second direction is less than an angle between the second surface and the first direction.

8. A dynamo-electric machine, comprising:
a stator; and
a rotor located inside the stator,
the stator including
the stator core; and
the coil according to claim 6.

9. The coil according to claim 6, wherein
the third surface of the first segment conductor connects the first surface of the first segment conductor and an extension plane of the side surface of the first segment conductor, the extension plane being separated from the first surface of the first segment conductor, and
the third surface of the first segment conductor is separated from an edge of the second surface of the second segment conductor at the inclined portion side.

10. The coil according to claim 9, wherein
in the first segment conductor, the third surface is an inclined surface that is opposite to the second surface and is most proximate to the second surface at a tip edge of the second surface.

* * * * *